United States Patent [19]
Shaver et al.

[11] Patent Number: 6,018,231
[45] Date of Patent: Jan. 25, 2000

[54] BATTERY CHARGING SYSTEM

[75] Inventors: David M. Shaver, Brockville; Carl W. Gifford, Elizabethtown, both of Canada

[73] Assignee: Black & Decker Inc., Newark, Del.

[21] Appl. No.: 09/008,881

[22] Filed: Jan. 20, 1998

Related U.S. Application Data

[60] Provisional application No. 60/060,761, Oct. 2, 1997.

[51] Int. Cl.[7] .................................................. H01M 10/46
[52] U.S. Cl. ............................................ 320/116; 320/118
[58] Field of Search ..................................... 320/103, 110, 320/116, 117, 118, 120, 121, FOR 105, FOR 114, FOR 115, FOR 116

[56] References Cited

U.S. PATENT DOCUMENTS

| | | | |
|---|---|---|---|
| 3,629,680 | 12/1971 | Baynes et al. | 320/2 |
| 4,311,952 | 1/1982 | Mabuchi et al. | 320/3 |
| 4,540,929 | 9/1985 | Binkley | 320/2 |
| 4,670,700 | 6/1987 | Henkel | 320/2 |
| 4,692,680 | 9/1987 | Sherer | 320/2 |
| 5,173,652 | 12/1992 | Henkel | 320/2 |
| 5,223,351 | 6/1993 | Wruck | 429/9 |
| 5,343,136 | 8/1994 | Yamaguchi et al. | 320/2 |
| 5,396,162 | 3/1995 | Brilmyer | 320/2 |
| 5,418,433 | 5/1995 | Nilssen | 315/175 |
| 5,568,038 | 10/1996 | Tatsumi | 320/106 |

FOREIGN PATENT DOCUMENTS

| | | |
|---|---|---|
| 0 229 722 A2 | 7/1987 | European Pat. Off. . |
| 0 372 653 A1 | 6/1990 | European Pat. Off. . |
| 0 616 409 A2 | 9/1994 | European Pat. Off. . |
| 0 657 982 A1 | 6/1995 | European Pat. Off. . |
| 2417718 | 4/1974 | Germany . |
| 24 40 218 | 8/1974 | Germany . |
| 41 00 571 A1 | 1/1991 | Germany . |
| 1 480 957 | 7/1977 | United Kingdom . |
| 2 205 697 | 12/1988 | United Kingdom . |
| WO 94/08383 | 4/1994 | WIPO . |

OTHER PUBLICATIONS

Vinal, "Storage Batteries," 4th Edition, No Month, 1955, p. 9.

JK Nor and V Paylovic, "Ultra Rapid Battery Charging: Charge Time, Efficiency, and Battery Life Considerations," Proceedings of 13th International Electric Vehicle Symposium, Osaka, Japan (1996), No Month.

*Primary Examiner*—Edward H. Tso
*Attorney, Agent, or Firm*—Fish & Richardson P.C., P.A.

[57] ABSTRACT

A battery charging system enables rapid recharging of a working battery without immediate access to ac power and without the need for current limit and/or overvoltage protection. The battery charging system makes use of a charging battery having a number of cells that is greater than the number of cells in the working battery. The charging battery produces a charging current that is proportional to the difference in the number of cells in each battery. In this manner, the battery recharging system is capable of rapidly recharging the working battery. The number of cells in the charging battery is selected, however, such that the series voltage of the charging battery cells is less than or equal to the maximum rated voltage of the working battery. Thus, the voltage of the charging battery is greater than the operating voltage of the working battery but less than or equal to the maximum voltage rating of the working battery. As a result, the charging battery is generally incapable of overcharging the working battery, and therefore does not require current limit and/or overvoltage protection circuitry.

8 Claims, 4 Drawing Sheets

BATTERY CHARGING SYSTEM

This application claims filing priority from United States provisional application Ser. No. 60/060,761, filed Oct. 2, 1997.

TECHNICAL FIELD

The present invention relates to battery charging systems and, more particularly, to systems for charging a working battery with a charging battery.

BACKGROUND INFORMATION

Many electrically-powered devices rely on rechargeable batteries as a source of operating power. Such devices include power tools, trimmers, mowers, chainsaws, vacuum cleaners, and lanterns, as well as electronic devices such as computers and telephones. Rechargeable batteries allow greater portability, but are limited by finite power resources. Therefore, users must be cognizant of the level of remaining battery resources, and plan for eventual depletion.

Upon total depletion of a rechargeable battery, it must be recharged. Recharging can be inconvenient, however, particularly when the user is in the field. For example, the user may not be near a source of ac power to carry out the recharging operation. Also, even if ac power is available, the time required for recharging results in work stoppage.

Rapid recharging systems typically require costly high-power electronics for the delivery of high levels of charging current, along with current limit and overvoltage circuitry for preventing over-charging and resulting damage to the working battery. Slower recharging systems are less costly, but prolong the recharging operation, undermining the basic objective of a quick return to service.

Many users simply carry a spare battery. This practice is common among portable computer and telephone users, and is often the case among users of power tools. Unfortunately, a spare battery can be expensive, and adds to the bulk of equipment that the user must carry in the field. In particular, a spare battery must be provided for each battery used in the field, i.e., for each of several devices. Also, many devices are not designed for spare battery replacement. Further, the user ultimately is limited by depletion of the spare battery.

SUMMARY

The present invention is directed to a battery charging system that enables rapid recharging of a working battery without immediate access to ac power and without the need for current limit and/or overvoltage protection. The battery charging system makes use of a charging battery having a number of cells that is greater than the number of cells in the working battery. The charging battery produces a charging current that is proportional to the difference in the number of cells in each battery. In this manner, the battery recharging system is capable of rapidly recharging the working battery.

The desired number of cells in the charging battery can be obtained, for example, by adding individual cells in series with a standard battery. The number of cells in the charging battery is selected, however, such that the series voltage of the cells is less than or equal to the maximum rated voltage of the working battery. Thus, the voltage of the charging battery is greater than the operating voltage of the working battery but less than or equal to the maximum voltage rating of the working battery. As a result, the charging battery is generally incapable of overcharging the working battery, and therefore does not require current limit and/or overvoltage protection circuitry. To avoid damage in the event of cell shortage, an inexpensive fuse can be provided.

The battery charging system of the present invention does not require the costly high power electronics associated with many other rapid recharging systems. In particular, the battery charging system does not require ac-dc conversion circuitry. If desired, however, the battery recharging system may form part of an integrated charging system having a charging unit that converts ac current from an external ac source to dc charging current. The charging unit can be designed to provide a maintenance charge for the charging battery and/or the working battery when access to an ac source is available. Also, a switch can be provided to selectively couple the charging unit to either the charging battery or the working battery.

The charging unit also can be designed to provide not only a maintenance charge, but a rapid recharging cycle, if cost permits, when ac power is available. Thus, the user can rely on the charging unit for rapid recharging when ac power is available, and rely on the charging battery for rapid recharging in the event ac power is not available. For rapid recharging from an ac source, current limit and overvoltage protection is provided, possibly with additional circuitry for indicating charge status.

In one embodiment, the present invention provides a charging system comprising a working battery, and a charging battery electrically coupled to a working battery to thereby charge the working battery, wherein a number of cells in the charging battery is greater than a number of cells in the working battery, and the series voltage of the number of cells in the charging battery is less than or equal to the maximum rated voltage of the working battery.

In a second embodiment, the present invention provides a charging system comprising a charging battery having a number of cells, a charging unit, electrically coupled to the charging battery, the charging unit converting ac current from an external ac source to dc charging current to charge the charging battery, and a coupling device that electrically couples the charging battery to a working battery to thereby charge the working battery, wherein the number of cells in the charging battery is greater than a number of cells in the working battery, and the series voltage of the number of cells in the charging battery is less than or equal to the maximum rated voltage of the working battery.

In a third embodiment, the present invention provides a charging system comprising a charging battery having a number of cells, a charging unit that converts ac current from an external ac source to dc charging current, a first coupling device that selectively couples the charging unit to the charging battery to thereby charge the charging battery, and a second coupling device that selectively couples either the charging battery or the charging unit to a working battery to thereby charge the working battery, wherein the number of cells in the charging battery is greater than a number of cells in the working battery, and the series voltage of the number of cells in the charging battery is less than or equal to the maximum rated voltage of the working battery.

In a fourth embodiment, the present invention provides a battery-powered system comprising a battery-powered working apparatus, a working battery that powers the battery-powered working apparatus, and a charging battery electrically coupled to the working battery to thereby charge the working battery, wherein the charging battery has a first number of cells greater than a second number of cells of the working battery, and wherein the series voltage of the first number of cells does not exceed the maximum rated voltage of the working battery.

In a fifth embodiment, the present invention provides a charging system comprising a charging battery having a first number of cells and a working battery having a second number of cells, wherein the first number of cells is greater than the second number of cells, each of the cells in the working battery and each of the cells in the charging battery has substantially the same voltage capacity, and the number of cells in the charging battery in excess of the second number of cells in the working battery is selected such that the series voltage of the cells in the charging battery does not exceed the maximum rated voltage of the working battery.

In a sixth embodiment, the present invention provides a charging system comprising a charging battery having a first voltage and a working battery having an operating voltage, wherein the first voltage is greater than the operating voltage of the working battery and less than or equal to the maximum rated voltage of the working battery.

In a seventh embodiment, the present invention provides a charging device for use in charging a working battery having a first number of cells and a maximum rated voltage, the charging device comprising a charging battery, wherein the charging battery has a second number of cells that is greater than the first number of cells of the working battery, and the series voltage of the second number of cells of the charging battery is less than or equal to the maximum rated voltage of the working battery.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
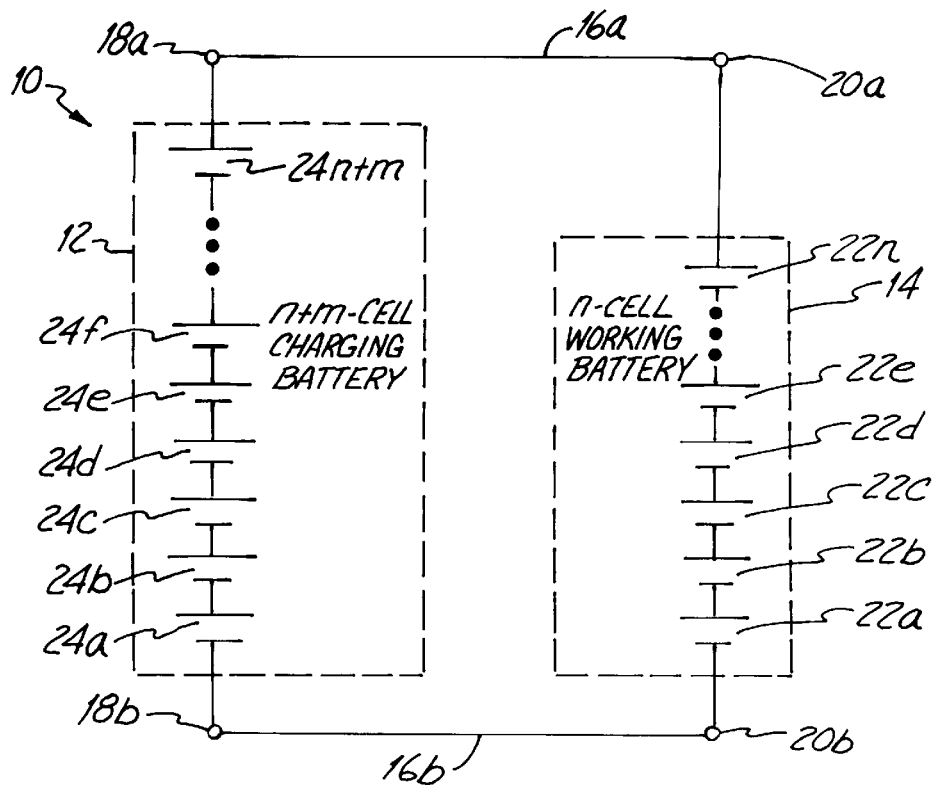
FIG. 1 is a diagram of a battery charging system.

FIG. 1 is a diagram of a battery recharging system 10 in accordance with one embodiment of the present invention. As shown in FIG. 1, battery recharging system 10 includes a charging battery 12 and a working battery 14. Leads $16_a$, $16_b$ electrically couple terminals $18_a$, $18_b$ of charging battery 12 to terminals $20_a$, $20_b$ of working battery 14. In accordance with the present invention, the number of cells in charging battery 12 is greater than the number of cells in working battery 14. In particular, working battery 14 includes n cells $22_a$–$22_n$, whereas charging battery 12 includes n+m cells $24_a$–$24_{n+m}$.

The cells in each of batteries 12, 14 preferably have the same voltage capacities, and are of the same type. For example, each cell may comprise a two-volt, sealed lead acid cell. Charging battery 12 produces a charging current that is proportional to the difference in the number of cells $22_a$–$22_n$, $24_a$–$24_{n+m}$ in each battery. In this manner, battery recharging system 10 is capable of rapidly recharging working battery 14. Charging battery 12 is generally intended for only a partial recharge, i.e., on the order of eighty percent, of the capacity of working battery 14. Thus, charging battery 12 need not provide a full recharge, but is capable of recharging working battery 14 one or more times for extended operation in the field. For a full recharge, it may be desirable to use a conventional overnight or rapid recharging system when ac power access is available.

The overall capacity of charging battery 12 can be selected based on the application and number of recharge cycles it is expected to deliver before it is recharged. The number of cells $24_a$–$24_{n+m}$ in charging battery 12 is selected, however, such that the series voltage of the charging battery cells is less than or equal to the maximum rated voltage of working battery 14. Thus, the voltage of charging battery 12 is greater than the operating voltage of working battery 14 but less than or equal to the maximum voltage rating of the working battery.

Maximum rated voltage generally refers to the published maximum voltage for a given battery, as determined by its manufacturer. To be conservative, however, manufacturers often incorporate a considerable margin between the published value and a practical maximum voltage rating at which normal operation is still possible. Therefore, as used herein, maximum rated voltage may more broadly refer to a maximum voltage that can be applied across the terminals of a working battery without causing significant, irreversible damage. The maximum rated voltage for commercially available six-cell, twelve-volt, sealed lead acid batteries, for example, ordinarily is in the range of 14.8 to 15 volts.

With a series voltage that is greater than the rated voltage but less than the maximum rated voltage of working battery 14, charging battery 12 is capable of providing rapid charging current but is generally incapable of overcharging. An inexpensive fuse may be provided, however, as a precaution in the event of cell shortage. It also is not necessary to incorporate the current limit and/or overvoltage protection circuitry that otherwise would increase the cost, complexity, and bulk of battery charging system 10. In addition, charging battery 12 does not require the costly high power electronics associated with other rapid recharging systems that rely on ac-dc power conversion.

The desired number of cells $24_a$–$24_{n+m}$ in charging battery 12 can be obtained by adding individual cells in series with a standard multi-cell battery. As an example, working battery 14 may be a battery having a standard voltage rating and cell configuration such as a six-cell, twelve-volt, sealed lead acid battery. For convenience, charging battery 12 may be assembled by simply adding one or more individual cells to a standard-cell battery that is similar to working battery 14. Specifically, each individual cell is added in series to the existing series of cells in the standard battery. Alternatively, if use of individual cells is difficult or inconvenient, two standard-cell batteries may be used together to provide charging battery 12. In this case, all of the cells in one of the batteries are fully utilized, and are connected in series with a selected cell or number of cells in the second battery.

For example, two six-cell batteries could be used with all six cells of a one battery and one or more cells of the other battery connected in series to form the charging battery. The remaining cells in the second battery are then disconnected from the series. In particular, the second battery can be tapped following the used cells to take the remaining cells out of service. As another alternative, charging battery 12 could comprise a custom assembly of individual cells connected in series and selected for use with a particular working battery configuration. The additional m cell or cells transform charging battery 12 into a source of high charging current for rapid charging of working battery 14. To avoid overcharging, however, the number m of additional cells is selected such that (n+m) times the voltage capacity per cell in charging battery 12 does not exceed the maximum voltage rating of working battery 14.

Figure 2:
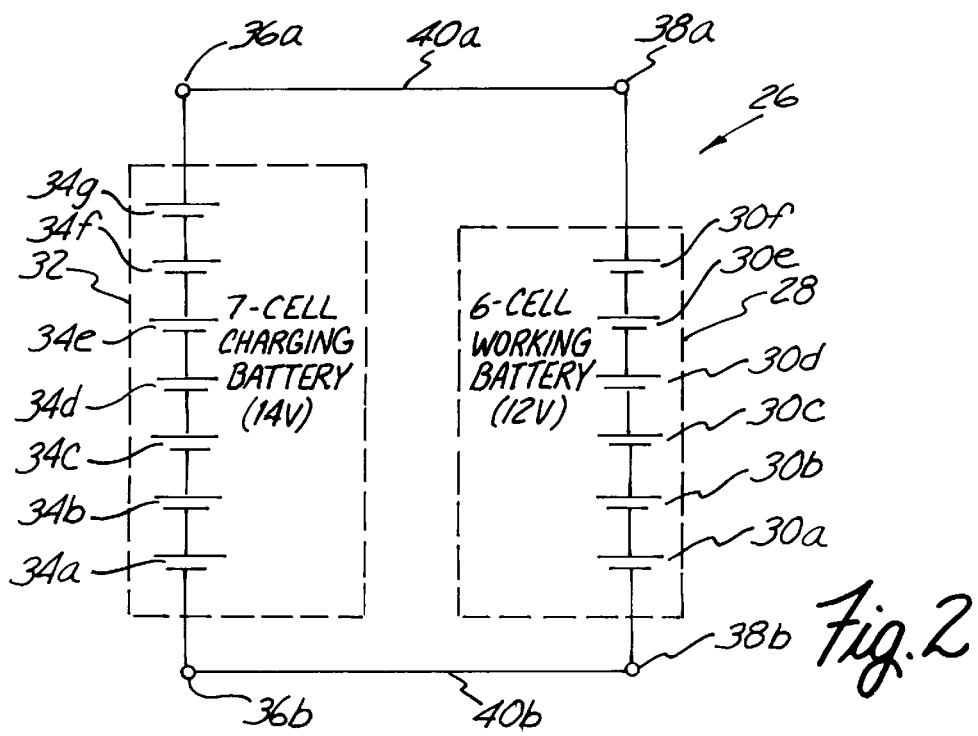
FIG. 2 is a diagram of a battery recharging system as shown in FIG. 1 incorporating a particular charging cell configuration.

FIG. 2 is a diagram of a battery recharging system 26 as shown in FIG. 1, but incorporating a particular cell configuration. In the example of FIG. 2, a working battery 28 is a six-cell, twelve-volt, sealed lead acid battery. Each of cells $30_a$–$30_f$ in working battery 28 has a voltage capacity of two volts. In this case, a charging battery 32 may include seven two-volt, sealed lead acid cells $34_a$–$34_g$ connected in series. In FIG. 2, terminals $36_a$, $36_b$ and $38_a$, $38_b$ of charging battery 32 and working battery 28 are connected as represented by leads $40_a$, $40_b$. The additional cell $34_g$ enables charging battery 32 to provide rapid charging current for working battery 28. With the seventh cell, however the series voltage of cells $34_a$–$34_g$ does not exceed the maximum voltage rating of working battery 28. As discussed above, the maximum voltage rating of a standard six-cell, twelve volt working battery 28, ordinarily will be on the order of 14.8 to 15 volts. Thus, the 14 volts produced across cells $34_a$–$34_g$ in charging battery 32 will generally be less than the maximum voltage rating of cells $30_a$–$30_f$ in working battery 28. As a result, charging battery 32 is capable of rapidly charging, but generally not overcharging, working battery 28. During the charging cycle, the voltage across cells $34_a$–$34_g$ in charging battery 32 will drop, tending toward equilibrium with the voltage of working battery 28. For increased charging current, in this example, it may be possible to add an eighth and possibly ninth cell to charging battery 32 provided that the maximum voltage rating of working battery 28 is not exceeded.

Figure 3:
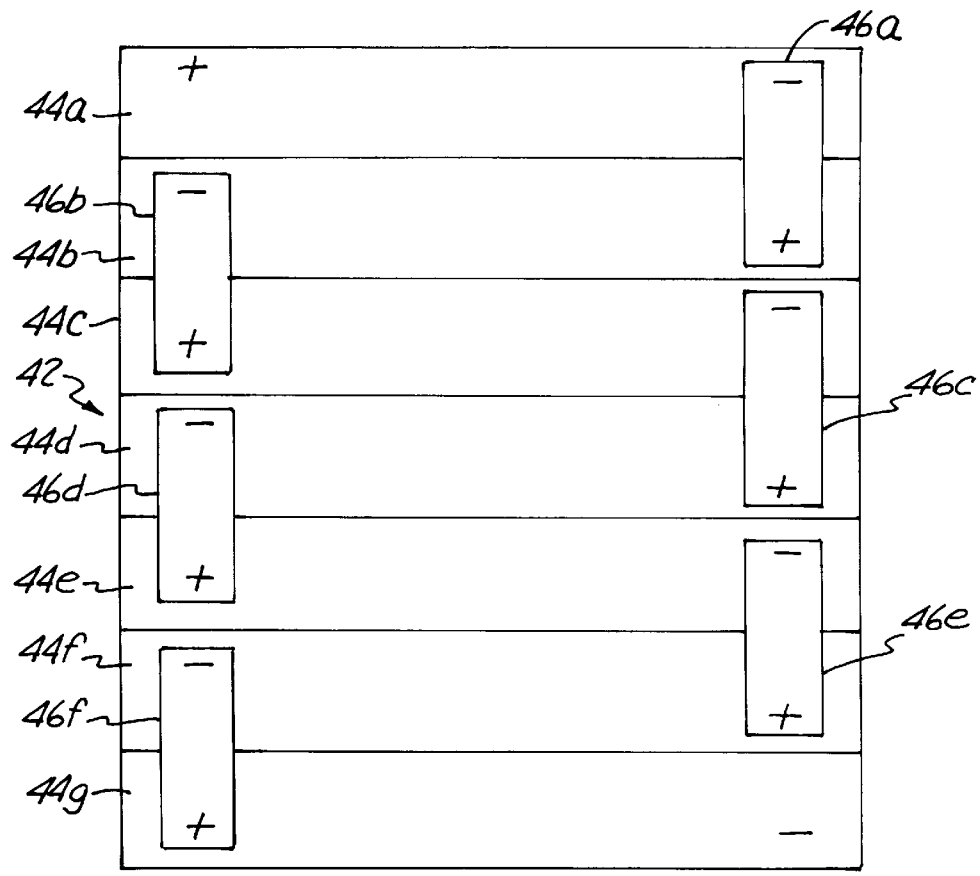
FIG. 3 is a diagram illustrating connection of multiple cells in a charging battery for use in a battery charging system as shown in FIG. 1.

FIG. 3 is a diagram of a charging battery 42 for use in a battery recharging system as shown in FIG. 1. In this example, charging battery 42 includes seven cells $44_a$–$44_g$ connected in series to charge a working battery having six cells, as shown in FIG. 2. As shown in FIG. 3, charging battery 42 can be assembled as a series of seven individual cells $44_a$–$44_g$. Each cell $44_a$–$44_g$ in the series has positive and negative terminals. With the exception of cell $44_a$, the positive terminal of each cell $44_a$–$44_g$ is connected to the negative terminal of an adjacent cell with a conductive lead or strap $46_a$–$46_f$. Thus, with the exception of cell $44_g$, the negative terminal of each cell $44_a$–$44_g$ is connected to the positive terminal of another adjacent cell with a lead or strap $46_a$–$46_f$. In this manner, the cells are connected in series to realize a seven-cell charging battery 42. Again, several alternatives exist for series connection of a desired number of cells, including use of a six-cell battery with added individual cells or use of two six-cell batteries with unused cells being disconnected.

The principles of the seven-cell configuration illustrated by FIGS. 1–3 can be readily applied to produce charging batteries for other working batteries having, for example, twelve, eighteen or more cells. As an illustration, for a twelve-cell, twenty-four volt, sealed lead acid working battery, the charging battery may include fourteen two-volt, sealed lead acid cells. In this case, two additional cells increase the rapid charging capability of the charging battery, but contribute to a series voltage that does not exceed the maximum voltage rating of the twelve-cell working battery. Further, for an eighteen-cell, thirty-six volt, sealed lead acid working battery, the charging battery 12 may include twenty-one two-volt sealed lead acid cells. In this case, three additional cells are provided. In both the twelve-cell and eighteen-cell working battery configurations, it is conceivable that additional cells, in excess of the fourteen and twenty-one described above, could be added for more rapid charging provided that the series voltage of the charging battery remains below the maximum rated voltage of the working battery. Also, a lesser number of additional cells conceivably could be used with a resulting reduction in charging current.

In each of the above working battery examples, i.e., six-cell, twelve-cell, eighteen-cell, it is apparent that in a preferred embodiment the charging battery includes one additional cell for each six cells, or twelve volts, provided by the working battery. Thus, in at least these preferred embodiments, a relationship can be drawn between the number of additional cells and the number of cells in the working battery. Specifically, desired charging efficiency has been observed without overcharging for working batteries having n cells when the charging battery includes n+m cells, and m is equivalent to n/6. For this relationship, it is assumed that the cells in both the working battery and charging battery are of the same type, e.g., sealed lead acid, and same voltage capacity, e.g., two volts. Again, additional cells may be added to the charging battery for increased charging current so long as the maximum voltage rating of the working battery is not exceeded. However, the above relationship between the number of working battery cells and the number of cells added to the charging battery may provide a convenient rule of thumb for achieving a suitably configured charging battery, particularly when using two-volt cells.

Figure 4:
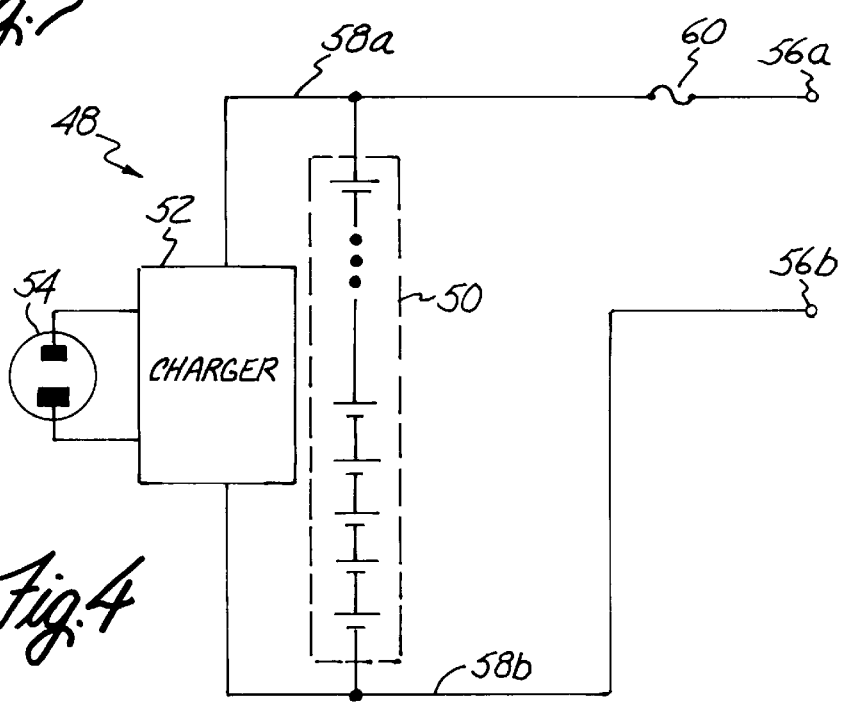
FIG. 4 is a diagram of an integrated battery charging system that includes a system as shown in FIG. 1 and an ac-dc charging unit.

A battery charging system in accordance with the present invention enables rapid charging of a working battery without access to ac power and without the need for current limit and overvoltage protection circuitry. If desired, however, the battery charging system may form part of an integrated charging system 48, as shown in FIG. 4, that includes both a charging battery 50 and a charging unit 52 for converting ac current from an external ac source 54 to dc charging current. Charging unit 52 is coupled across charging battery 50 and output terminals $56_a$, $56_b$ as indicated by lines $58_a$, $58_b$. In this manner, charging unit 52 can be designed to charge charging battery 50 to ensure operability of the charging battery in the field. Also, if a working battery is stored in proximity to a source of ac power, charging unit 52 can serve to charge the working battery. The charge provided by the ac-dc charging unit 52 can be a low-level maintenance charge that slowly charges the charging battery 50 and/or working battery, for example, overnight. In this case, charging unit 52 can be assembled from relatively low-cost components to minimize the cost of integrated charging system 48. Still, it may be desirable to provide charging unit 52 with standard current limit and overvoltage protection circuitry to protect the batteries from fault-induced damage. For some applications, charging unit 52 may include high power electronics for rapid charging of the charging battery 50 and/or the working battery. In this case, the cost of the high power electronics may be justified by the convenience and speed of recharging the charging battery. As a further alternative, ac-dc charging unit 52 may be configured to provide either a maintenance charge or a rapid charge on a selective basis. A fuse 60 may be provided between charging battery and working battery to disable charging current in the event of an over-current situation.

Charging unit 52 and charging battery 50 preferably are provided in a common housing that is portable to enable use of the charging battery in the field. Thus, charging unit 52 may include a cable or receptacle configured to engage a source of ac power. System 48 may include a variety of connection devices, represented by leads $58_a$, $58_b$, and terminals $56_a$, $56_b$, for conveying charging current to a working battery. For example, a set of cables may be extendable from the housing to engage terminals associated with the working battery. Alternatively, such cables may engage terminals connected to the working battery but formed in a device in which the working battery is installed. The cables would be connected to the appropriate terminals of charging battery 50 and charging unit 52 to convey charging current to the working battery. As another alternative, system 48 may have a cable with a plug or socket configured to engage a reciprocally formed plug or socket associated with the working battery. The plug or socket may be formed as part of the battery or as part of a device that is powered by the working battery. In either case, the plug or socket transmits charging current from the cable to the terminals of the working battery. As a further alternative, the connection device may include a set of terminals mounted in the housing of charging system 48 that define a receptacle, or "port," for receiving the working battery. In some cases, the working battery would be removed from the device in which it is installed and placed in the receptable for charging. In other cases, the entire device could be placed in the charging receptacle.

Figure 5:
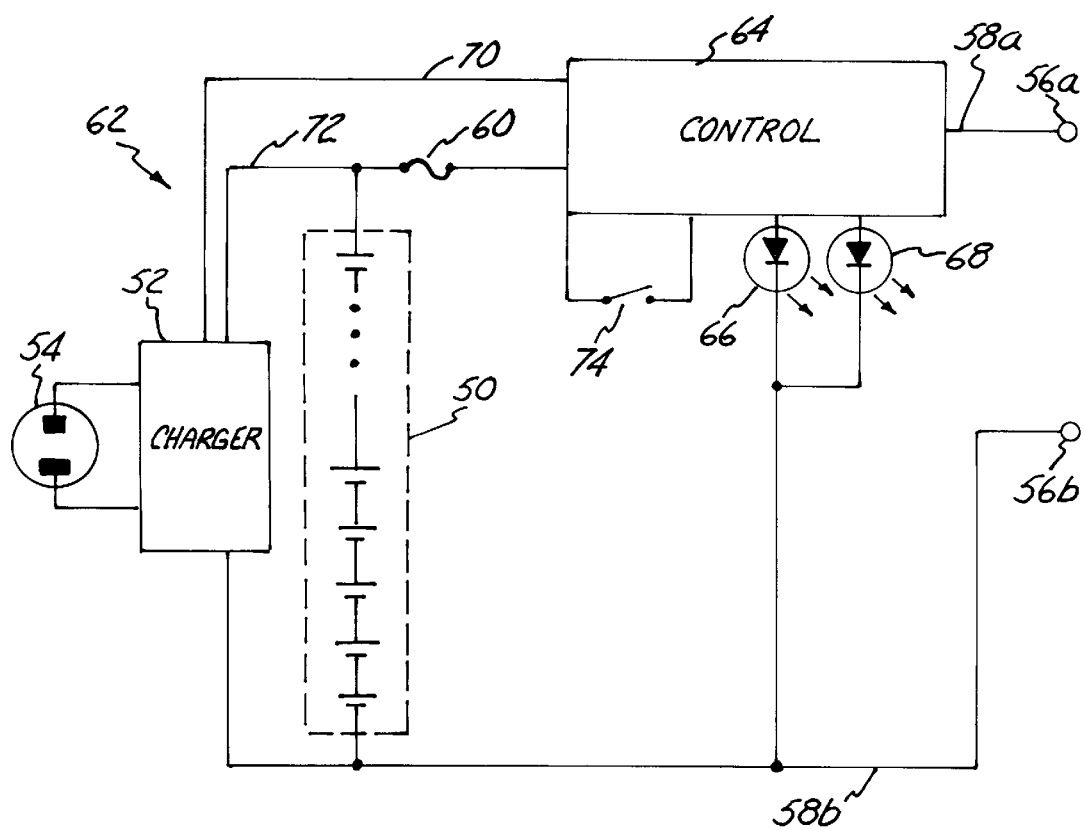
FIG. 5 is a diagram of a battery charging system as shown in FIG. 4 with additional control circuitry.

FIG. 5 is a diagram of a battery charging system 62 substantially as shown in FIG. 4 but with additional control circuitry 64. In the example of FIG. 5, control circuitry 64 may include circuitry for indicating charge status such as the completion status of rapid or maintenance charging, how much charge remains in charging battery 50, and how much charge remains in the working battery. For certain applications, control circuitry 64 also may include current limit circuitry as well as output voltage control to handle various nominal battery voltages. As shown in FIG. 5, control circuitry 64 may drive one or more light emitting diodes 66, 68 to provide various indications of charge status. As in the example of FIG. 4, a fuse 60 may be connected in series between charging battery 50 and the working battery. In addition, charging unit 52 and charging battery 50 may be selectively connectable across output terminals $56_a$, $56_b$ to charge the working battery via lines 70, 72, respectively. Actuation of a switch 74 determines whether charging unit 52 or charging battery 50 is connected to charge the working battery across terminals $56_a$, $56_b$. In this manner, charging unit 52 can be selected to provide a charging current to the working battery. As described with reference to FIG. 4, charging unit 52 may include maintenance and rapid charge settings. Alternatively, charging battery 50 can be selected to provide a rapid charging current to working battery. When a working battery is not connected to output terminals $56_a$, $56_b$, charging unit 52 can provide either a rapid or maintenance charge to charging battery 50.

Figure 6:
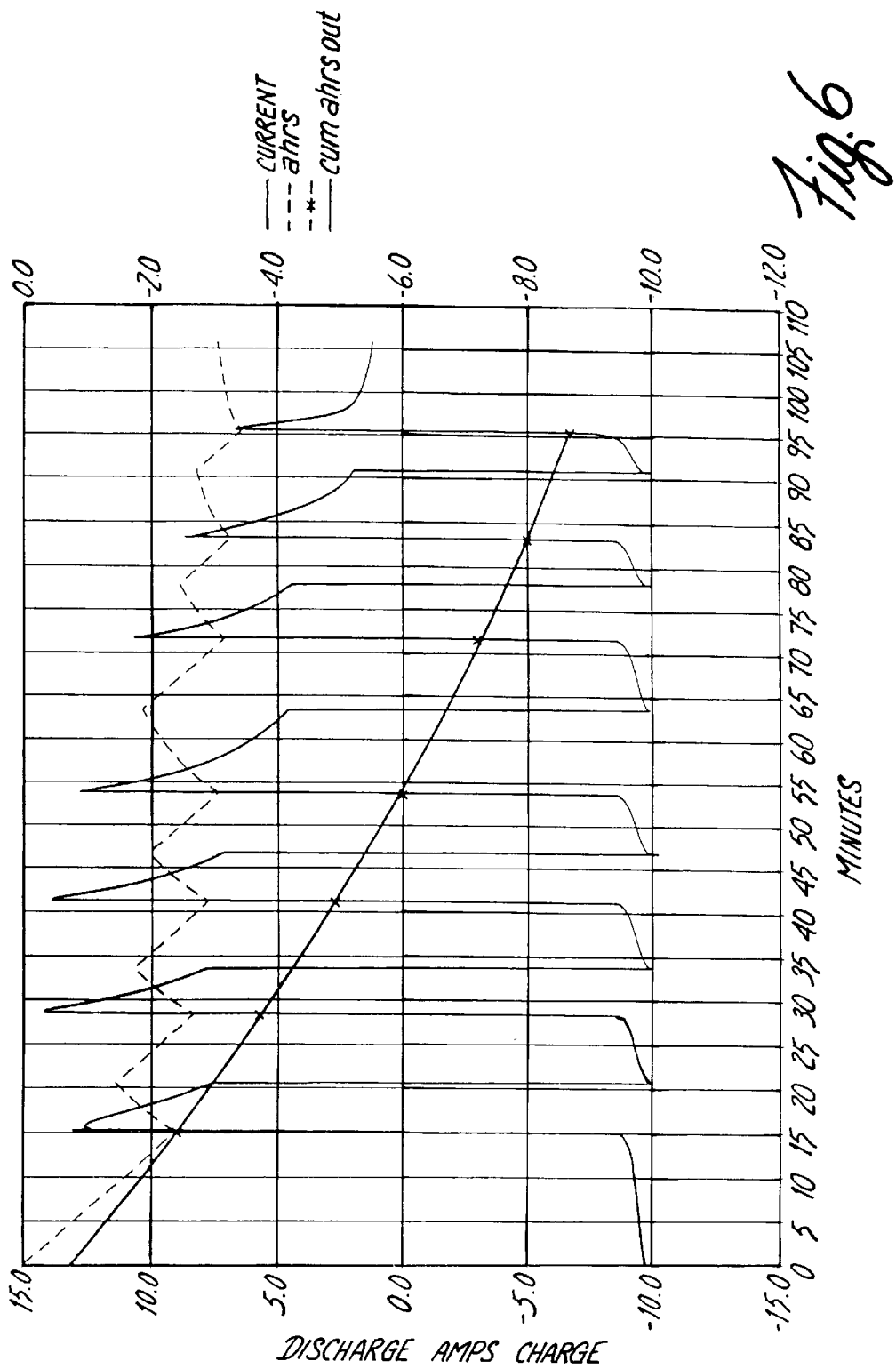
FIG. 6 is a graph illustrating the charging performance of a battery charging system as shown in FIG. 1.

FIG. 6 is a graph illustrating the charging performance of a battery charging system 48 constructed as shown in FIG. 4. Specifically, an experiment was conducted with a charging battery having seven two-volt, sealed lead acid cells connected in series. In this experiment, commercially available Panasonic 7.2 amp-hour (ahr) cells were used. The charging battery was formed by connecting a first six-cell, twelve-volt Panasonic LCR 7.2 ahr battery in series with a second six-cell, twelve-volt Panasonic LCR 7.2 ahr battery that was tapped after the first cell to effectively disconnect the remaining five cells. This battery is commercially available from Panasonic Industrial Company, Secaucus, N.J., U.S.A. The result was a seven-cell, fourteen-volt charging battery. As an alternative, individual two-volt, sealed lead acid cells are commercially available from Hawker Energy, Belle Mead, N.J., U.S.A. These individual cells can be assembled in series to form a seven-cell battery. The charging unit used to charge the charging battery was a commercially available Kwonnie two-step string trimmer charger, commercially available from Kwonnie Electrical Products Limited, Hong Kong, China. The working battery was a commercially available six-cell, twelve-volt Panasonic 4 ahr battery. As shown in FIG. 6, a charging process was performed whereby the charging battery was used to charge the working battery over several charge and discharge cycles.

First, the charging battery and the working battery were both fully charged to approximately 14 volts and 12 volts, respectively, using the Kwonnie string trimmer charger. The working battery was then discharged at 10 amps to a voltage of approximately 9.6 volts. From this state, the working battery was immediately recharged using the charging battery for five minutes and discharged again. The initial discharge was observed to last fifteen minutes. After a first recharge cycle using the charging battery, a second discharge lasted approximately eight minutes. As illustrated in FIG. 6, this cycle was repeated for approximately one and one-half hours at the end of which time eight amp hours had been delivered by the working battery over a period of approximately fifty minutes of actual run time.

Based on these test results, it is apparent that a charging system 48 as shown in FIG. 6 can rapidly and effectively extend the operating time of working batteries in the field, particularly when an ac-dc charging unit is unavailable or incapable of rapid charging. The charging battery also is very efficient, generating relatively low thermal losses. This rapid charging capability is especially advantageous in view of the elimination of standard current limit and overvoltage circuitry ordinarily required to prevent damage to the working battery. The charging battery is generally incapable of overcharging the working battery, and therefore provides a simple and relatively inexpensive option for portable rapid charging. In addition to the above advantages, the charging battery is generally susceptible to fabrication by adaptation of existing battery components and charging hardware. Also, the portability and resulting field availability of the charging battery may enable the use of smaller working batteries, providing greater ergonomics and lower cost for electrically powered devices. As another advantage, it appears that periodic high-current charging, as provided by the charging battery, may increase the cycle life of working battery. This phenomenon has been reported, for example, by Nor and Pavlovic, Ultra Rapid Battery Charging: Charge Time, Efficiency, and Battery Life Considerations, Proceedings of the 13th International Electric Vehicle Symposium, Osaka, Japan, October 1996.

Although the charging system of the present invention has been described primarily in the context of sealed lead acid batteries, it may be readily applicable to alternative battery technologies such as NiCad. Moreover, it is conceivable that a charging battery incorporating cells of one battery type may be useful in charging a working battery with cells of another battery type. For example, a series of sealed lead acid battery cells could be used to charge a series of NiCad cells, and vice versa, provided that the number of charging cells and their voltage capacities are selected such that the series charging voltage does not exceed the maximum voltage rating of the working battery. Also, it is conceivable that cells having voltage capacities that differ from those in the working battery may be used. Again, an additional cell or cells in the charging battery enable the generation of a rapid charging current without the need for current limit and overvoltage circuitry so long as this overall charging voltage limitation is maintained. Therefore, whereas the charging system present invention may be particularly useful in charging sealed lead acid batteries ordinarily associated with electrically powered devices such as power tools, trimmers, mowers, chainsaws, vacuum cleaners, lanterns, and the like, the system may find ready application in charging electronic devices such as computers and telephones.

A number of embodiments of the present invention have been described. Nevertheless, it will be understood that various modifications may be made without departing from the spirit and scope of the invention. Accordingly, other embodiments are within the scope of the following claims.

What is claimed is:

1. A charging system comprising:

a working battery;

a charging battery electrically coupled to the working battery to thereby charge the working battery, wherein the charging battery is coupled to the working battery with substantially no intervening current limit circuitry to limit the level of current delivered by the charging battery to the working battery, and wherein a number of cells in the charging battery is greater than a number of cells in the working battery, the series voltage of the number of cells in the charging battery being less than or equal to a maximum rated voltage of the working battery;

a charging unit, electrically coupled to the charging battery, the charging unit converting ac current from an external ac source to dc charging current to charge the charging battery; and current limit circuitry that limits the level of the dc charging current produced by the charging unit.

2. The system of claim 1, further comprising a fuse between the charging battery and the working battery.

3. The system of claim 1, wherein the working battery includes only six cells and the charging battery includes only seven cells.

4. The system of claim 1, wherein the working battery includes only twelve cells and the charging battery includes greater than twelve and less than or equal to fourteen cells.

5. The system of claim 1, wherein the working battery includes only eighteen cells and the charging battery includes greater than eighteen and less than or equal to twenty-one cells.

6. The system of claim 1, wherein each of the cells in the working battery and the charging battery has substantially the same voltage capacity.

7. The system of claim 1, wherein each of the cells in the working battery and the charging battery has a voltage capacity of approximately two volts.

8. The system of claim 1, wherein each of the cells in the working battery and the charging battery is a sealed lead acid battery cell.

* * * * *